United States Patent
Hara et al.

(10) Patent No.: US 6,947,674 B2
(45) Date of Patent: Sep. 20, 2005

(54) CIRCUIT FOR PREVENTING TRANSMISSION OF A FIXED PATTERN OF OPTICAL DIGITAL TRANSMISSION EQUIPMENT

(75) Inventors: Yasushi Hara, Tokyo (JP); Junichi Hayasaka, Tokyo (JP)

(73) Assignee: NEC Corporation (JP)

( * ) Notice: Subject to any disclaimer, the term of this patent is extended or adjusted under 35 U.S.C. 154(b) by 489 days.

(21) Appl. No.: 09/885,318

(22) Filed: Jun. 19, 2001

(65) Prior Publication Data

US 2001/0053010 A1 Dec. 20, 2001

(30) Foreign Application Priority Data

Jun. 19, 2000 (JP) .................................. 2000-183653

(51) Int. Cl.[7] .............................................. H04B 10/00
(52) U.S. Cl. ...................... 398/182; 398/188; 398/192; 398/198
(58) Field of Search ................................ 375/367–368; 398/140–172, 182–201; 370/532

(56) References Cited

U.S. PATENT DOCUMENTS

| | | | | |
|---|---|---|---|---|
| 4,817,148 | A | * | 3/1989 | Lafferty et al. ............. 380/268 |
| 4,998,263 | A | * | 3/1991 | Kendall et al. ............. 375/367 |
| 5,121,385 | A | * | 6/1992 | Tominaga et al. ........... 370/435 |
| 5,331,671 | A | * | 7/1994 | Urbansky .................... 375/371 |
| 5,822,325 | A | * | 10/1998 | Segaram et al. ............. 370/501 |
| 6,684,070 | B1 | * | 1/2004 | Rosen et al. ................ 455/427 |

FOREIGN PATENT DOCUMENTS

| | | |
|---|---|---|
| JP | 63300642 | 7/1988 |
| JP | 3244238 | 10/1991 |
| JP | 3-296336 | 12/1991 |
| JP | 5199199 | 8/1993 |
| JP | 6-268692 | 9/1994 |

OTHER PUBLICATIONS

Japanese Office Action issued May 16, 2003 (w/English translation of relevant portion).

* cited by examiner

Primary Examiner—Agustin Bello
(74) Attorney, Agent, or Firm—Dickstein, Shapiro, Morin & Oshinsky, LLP.

(57) ABSTRACT

Provided are a multiplexing circuit for multiplexing a memory output signal output by a memory for temporarily accumulating a low-order group signal with an overhead bit necessary for optical digital transmission and a pattern generation circuit for generating an unfixed pattern having no fixed value. An unfixed pattern is applied to the multiplexing circuit while the memory outputs a fixed pattern. A selection circuit provided between the multiplexing circuit and the memory selects an unfixed pattern between a fixed pattern output by the memory and an unfixed pattern output by the pattern generation circuit.

6 Claims, 3 Drawing Sheets

CIRCUIT FOR PREVENTING TRANSMISSION OF A FIXED PATTERN OF OPTICAL DIGITAL TRANSMISSION EQUIPMENT

BACKGROUND OF THE INVENTION

1. Field of the Invention

The present invention relates to a circuit for preventing transmission of a fixed pattern of an optical digital transmission equipment, and more particularly, to a circuit for preventing transmission of a fixed pattern of an optical digital transmission equipment which eliminates a problem caused, when an electric signal to be multiplexed by an overhead bit necessary for optical digital transmission has a fixed value, by the generation of a direct current component at an O/E conversion unit for converting the optical signal into an electric signal.

2. Description of the Related Art

Well-known as large-volume transmission is multi-channel•time-divisional optical digital transmission. Techniques related to the optical digital transmission are recited, for example, in Japanese Patent Laying-Open (Kokai) No. Showa 63-300642, Japanese Patent Laying-Open (Kokai) No. Heisei 3-244238 and Japanese Patent Laying-Open (Kokai) No. Heisei 5-199199. The literature recites that a multiple conversion device necessary for optical digital transmission needs comparison between a phase of a write clock of a low-order group input signal for writing data into a memory which temporarily stores data and a phase of a read clock of a high-order group signal for reading the data therefrom and control of these phases.

FIG. 3 shows one example of a conventional optical digital transmission equipment having such a phase comparator.

A low-order group signal 101 is temporarily accumulated in a memory 102. Transfer of a write address 105 to the memory 102 by a write address counter 103 based on a low-order group signal clock 104 results in that the low-order group signal 101 is written in the memory 102. Transfer of a read address 108 to the memory 102 by a read address counter 106 based on a high-order group signal clock 107 results in that a memory output signal 109 is read from the memory 102.

The read memory output signal 109 has an overhead bit necessary for optical digital transmission multiplexed at a multiplexing circuit 110. A multiplexed signal 111 output from the multiplexing circuit 110 is converted into an optical signal at an E/O conversion unit 112 and transmitted to an O/E conversion unit 114 on the reception side through an optical fiber 113.

As is already described, a phase comparator 115 is provided. The phase comparison circuit 115 monitors a phase difference between a phase of write to the memory 102 and a phase of read from the memory 102 and when the low-order group signal clock 104 gets so much out of order because of disturbance etc. that a memory phase difference enters a range in which memory slippage occurs, the circuit considers it as overflow or underflow and outputs a first reset signal 116 in order to forcibly return the memory phase difference to an appropriate value.

Data accumulated at the memory 102 is cleared by the first reset signal 116. As a result of this clearance, the memory 102 outputs a fixed value "1" which is a memory initial value during a period from when the low-order group signal 101 is newly written in the memory 102 until when the same is newly and normally read.

Since a time period where such a fixed value "1" is continuously output is increased in proportional to a memory capacity of the memory 102, the larger the memory capacity is, the larger a fixed value continuous output time becomes. The multiplexed signal 111, that is, a digital signal multiplexed and then output by the multiplexing circuit 110 to which such a fixed value is applied has its mark rate (duty ratio) not attaining 0.5. Mark rate failing to attain 0.5 represents that a direct current component is generated.

When such a direct current component is generated, such an unfavorable phenomenon occurs as a discrimination error that a discriminator 118 of the O/E conversion unit 114 including a capacitor 117 erroneously discriminates a reception signal, so that a clock extraction circuit 119 fails to extract a clock of the reception signal to result in causing stop of an output of a clock output signal 120. As another unfavorable phenomenon, when such a fixed value signal is used in an optical wavelength multiplex transmission system, mean power of an optical signal in the system changes to affect a signal of other wavelength.

Technique for suppressing generation of such a direct current component is known. According to the well-known technique, a scrambling circuit is disposed preceding to an E/O converter and a descrambling circuit is disposed succeeding to an O/E converter. This technique has a problem that when transmission is conducted at a super-high speed, it is difficult to provide a scrambling circuit and a descrambling circuit in terms of device designing, resulting in increasing a circuit scale.

Suppressing generation of such a direct current component is demanded. Further demanded is simplification of a circuit for suppressing generation of such a direct current component.

SUMMARY OF THE INVENTION

An object of the present invention is to provide a circuit for preventing transmission of a fixed pattern of an optical digital transmission equipment which enables generation of a direct current component to be suppressed.

Another object of the present invention is to provide a circuit for preventing transmission of a fixed pattern of an optical digital transmission equipment whose circuit for suppressing generation of a direct current component is simple.

According to one aspect of the invention, a circuit for preventing transmission of a fixed pattern of an optical digital transmission equipment, comprises a memory for temporarily accumulating a low-order group signal, a multiplexing circuit for multiplexing an output signal output by the memory with an overhead bit necessary for optical digital transmission, and a pattern generation circuit for generating an unfixed pattern having no fixed value and outputting the pattern to the multiplexing circuit.

In a circuit for preventing transmission of a fixed pattern of an optical digital transmission equipment according to the present invention, since multiplexing is conducted with respect to an unfixed pattern, none of failures which would occur when a fixed pattern is multiplexed is involved.

In the preferred construction, the unfixed pattern is applied to the multiplexing circuit while the memory outputs a fixed pattern.

In another preferred construction, the circuit for preventing transmission of a fixed pattern of an optical digital transmission equipment further comprises a selection circuit connected between the multiplexing circuit and the memory, wherein between the fixed pattern output by the memory and the unfixed pattern output by the pattern generation circuit, the selection circuit selects the unfixed pattern.

Furthermore, additional provision of a selection circuit and a pattern generation circuit for unfixing a signal sufficiently minimizes an increase in a circuit scale.

In another preferred construction, the circuit for preventing transmission of a fixed pattern of an optical digital transmission equipment further comprises a phase comparator for outputting a reset signal which resets the memory based on a phase difference between a phase of write to the memory and a phase of read from the memory, wherein the selection circuit selects the unfixed pattern based on the reset signal.

Moreover, additional provision of a simple circuit by making use of a well-known phase comparator enables a signal to be multiplexed to be unfixed.

In another preferred construction, the circuit for preventing transmission of a fixed pattern of an optical digital transmission equipment further comprises a phase comparator for comparing a phase difference between a phase of write to the memory and a phase of read from the memory and when the phase difference is larger than a set value set in advance, outputting a reset signal which resets the memory, wherein the selection circuit selects the unfixed pattern based on the reset signal.

In another preferred construction, the circuit for preventing transmission of a fixed pattern of an optical digital transmission equipment further comprises a reset signal detection circuit for outputting a switching signal based on a read address signal applied to the memory from when the memory is reset until when a signal first written into the memory is read from the memory, wherein the selection circuit selects the unfixed pattern based on the reset signal and the switching signal.

Furthermore, it is possible to favorably make use of a well-known read address signal.

In another preferred construction, the circuit for preventing transmission of a fixed pattern of an optical digital transmission equipment further comprises a reset signal detection circuit for detecting the reset signal, wherein a read address signal applied to the memory is also applied to the reset signal detection circuit, the reset signal detection circuit outputs a switching signal based on the read address signal from when the memory is reset until when a signal first written into the memory is read from the memory, and the selection circuit selects the unfixed pattern based on the reset signal and the switching signal.

In another preferred construction, the circuit for preventing transmission of a fixed pattern of an optical digital transmission equipment further comprises a determination circuit and an OR circuit, wherein the determination circuit is provided between the OR circuit and an input side of the memory, the determination circuit outputs a switch signal when a signal written into the memory has a fixed pattern for a set time, to the OR circuit, the switching signal and the switch signal are applied, and the selection circuit selects the unfixed pattern based on the switch signal in addition to the reset signal and the switching signal.

Moreover, also when a low-order group signal is fixed, fixing of a signal can be prevented by making use of the selection circuit. Unfixed pattern being a random pattern is sufficiently effective, so that a mark rate can be simply 0.5.

In another preferred construction, the unfixed pattern is a random pattern.

According to another aspect of the invention, a circuit for preventing transmission of a fixed pattern of an optical digital transmission equipment, comprises a memory for temporarily storing data, a multiplexing circuit for multiplexing a signal output by the memory with an overhead bit necessary for optical digital transmission, a pattern generation circuit for generating an unfixed pattern having no fixed value and outputting the pattern to the multiplexing circuit, an E/O conversion unit for converting a signal output by the multiplexing circuit into an optical signal, an optical fiber for transmitting an optical signal output by the E/O conversion unit, and an O/E conversion unit for converting an optical signal output by the optical fiber into an electric signal, wherein while the memory outputs a fixed pattern, the unfixed pattern is applied to the multiplexing circuit.

In the preferred construction, the unfixed pattern is a random pattern.

In another preferred construction, the circuit for preventing transmission of a fixed pattern of an optical digital transmission equipment further comprises a selection circuit connected between the multiplexing circuit and the memory, wherein between the fixed pattern output by the memory and the unfixed pattern output by the pattern generation circuit, the selection circuit selects the unfixed pattern.

In another preferred construction, the circuit for preventing transmission of a fixed pattern of an optical digital transmission equipment further comprises a phase comparator for outputting a reset signal which resets the memory based on a phase difference between a phase of write to the memory and a phase of read from the memory, wherein the selection circuit selects the unfixed pattern based on the reset signal.

In another preferred construction, the circuit for preventing transmission of a fixed pattern of an optical digital transmission equipment further comprises a phase comparator for comparing a phase difference between a phase of write to the memory and a phase of read from the memory and when the phase difference is larger than a set value set in advance, outputting a reset signal which resets the memory, wherein the selection circuit selects the unfixed pattern based on the reset signal.

In another preferred construction, the circuit for preventing transmission of a fixed pattern of an optical digital transmission equipment further comprises a reset signal detection circuit for outputting a switching signal based on a read address signal applied to the memory from when the memory is reset until when a signal first written into the memory is read from the memory, wherein the selection circuit selects the unfixed pattern based on the reset signal and the switching signal.

In another preferred construction, the circuit for preventing transmission of a fixed pattern of an optical digital transmission equipment further comprises a reset signal detection circuit for detecting the reset signal, wherein a read address signal applied to the memory is also applied to the reset signal detection circuit, the reset signal detection circuit outputs a switching signal based on the read address signal from when the memory is reset until when a signal first written into the memory is read from the memory, and the selection circuit selects the unfixed pattern based on the reset signal and the switching signal.

In another preferred construction, the circuit for preventing transmission of a fixed pattern of an optical digital transmission equipment further comprises a determination circuit and an OR circuit, wherein the determination circuit is provided between the OR circuit and an input side of the memory, the determination circuit outputs a switch signal when a signal written into the memory has a fixed pattern for a set time, to the OR circuit, the switching signal and the switch signal are applied, and the selection circuit selects the unfixed pattern based on the switch signal in addition to the reset signal and the switching signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
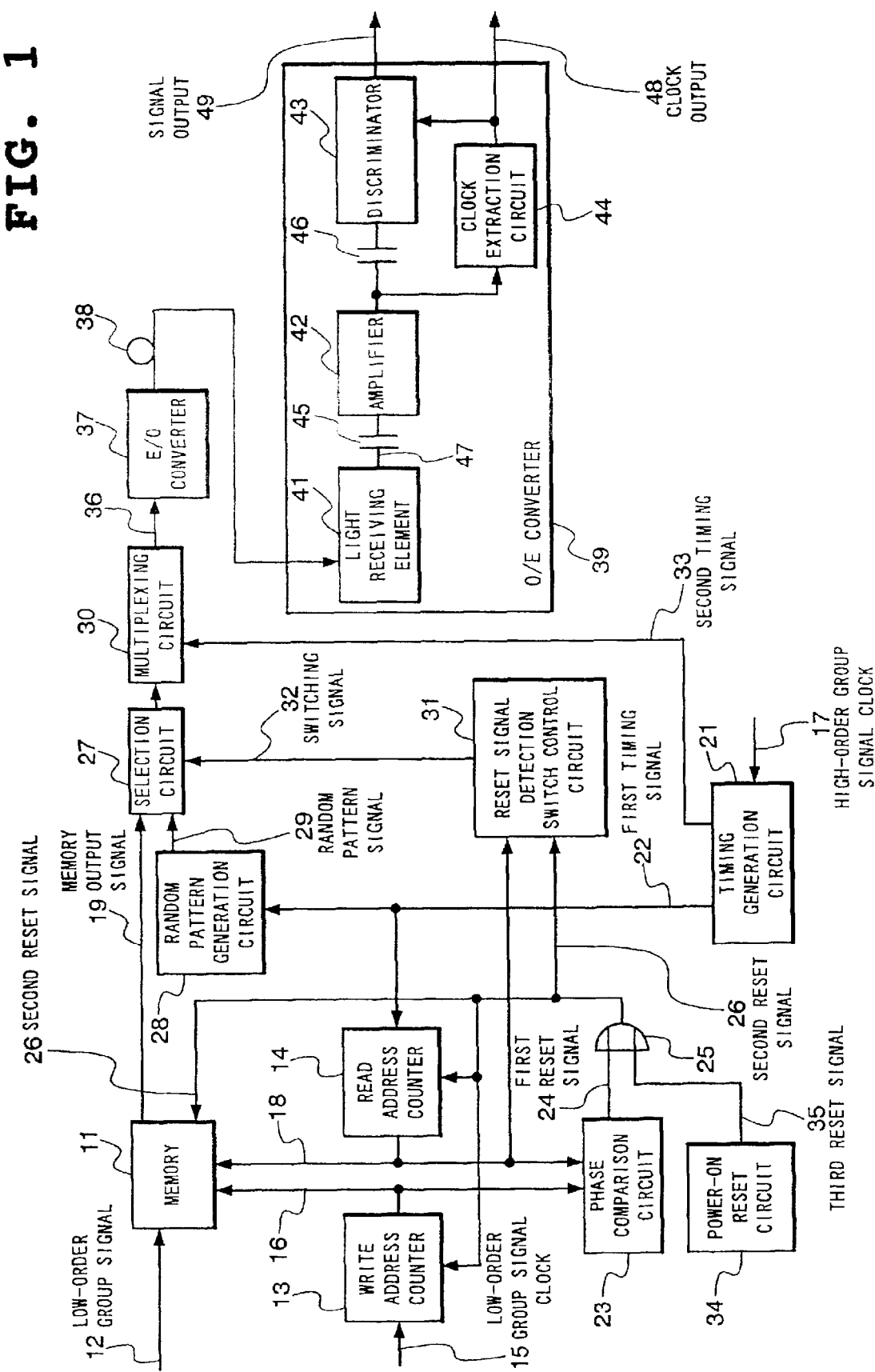
FIG. 1 is a circuit diagram showing a structure of a circuit for preventing transmission of a fixed pattern of an optical digital transmission equipment according to a first embodiment of the present invention.

Coincident and corresponding to the figure, in the embodiment of the circuit for preventing transmission of a fixed pattern of an optical digital transmission equipment according to the present invention, a memory is provided together with a multiplexing circuit. To a memory 11, a low-order group signal 12 is applied and temporarily accumulated therein as illustrated in FIG. 1. The memory 11 has a depth of n-bit for temporarily storing data for the purpose of speed change and absorption of clock disturbance. A write address counter 13 and a read address counter 14 are connected to the memory 11. Transfer of a write address signal 16 to the memory 11 by the write address counter 13 based on a low-order group signal clock 15 results in writing the low-order group signal 12 into the memory 11. Transfer of a read address signal 18 to the memory 11 by the read address counter 14 based on a high-order group signal clock 17 results in reading a memory output signal 19 from the memory 11.

The high-order group signal clock 17 is applied to the read address counter 14 through a timing generation circuit 21. The timing generation circuit 21 outputs a first timing signal 22 based on the high-order group signal clock 17. The read address counter 14 transmits the read address signal 18 to the memory 11 based on the first timing signal 22.

The write address counter 13 and the read address counter 14 are connected to a phase comparator 23. The write address signal 16 output from the write address counter 13 and the read address signal 18 output from the address counter 14 are applied to the phase comparator 23. The phase comparator 23 compares a phase of the write address signal 16 and a phase of the read address signal 18 and monitors the degree of a phase difference therebetween and when the degree of the phase difference enters a range in which slippage of the memory 11 occurs, considers it as overflow or underflow to output a first reset signal 24 for forcibly returning the memory phase difference to an appropriate value.

The first reset signal 24 passes through an OR circuit 25 to become a second reset signal 26, which signal is applied to the memory 11, the write address counter 13 and the read address counter 14. The memory output signal 19 output by the memory 11 upon receiving the second reset signal 26 has the fixed value "1" until the memory returns to a normal state.

The memory 11 is connected to a multiplexing circuit 30. Between the multiplexing circuit 30 and the memory 11, a selection circuit 27 is provided. To the selection circuit 27, a random pattern generation circuit 28 is connected. The first timing signal 22 generated by the timing generation circuit 21 is applied to the random pattern generation circuit 28 in addition to the read address counter 14. Upon receiving the first timing signal 22, the random pattern generation circuit 28 generates an unfixed (random) pattern signal 29 under the control of the first timing signal 22. Preferable as the unfixed pattern 29 is a random pattern composed of a random signal.

A reset signal detection switch control circuit 31 for detecting the second reset signal 26 to generate a switching signal is connected to the selection circuit 27. The reset signal detection switch control circuit 31 is provided between the selection circuit 27 and the OR circuit 25. The first reset signal 24 passes through the OR circuit 25 to become the second reset signal 26 which is applied to the reset signal detection switch control circuit 31. The already described read address signal 18 generated by the read address counter 14 is applied to the reset signal detection switch control circuit 31. The reset signal detection switch control circuit 31 receiving the read address signal 18 and the second reset signal 26 generates and outputs a switching signal 32. The switching signal 32 is applied to the selection circuit 27.

When the first reset signal 24 is output from the phase comparator 23, the selection circuit 27 selects the unfixed (random) pattern signal 29 between the memory output signal 19 and the unfixed pattern signal 29 based on the switching signal 32 output by the reset signal detection switch control circuit 31 receiving the read address signal 18 and the second reset signal 26 and outputs the unfixed pattern signal 29. Thus selected unfixed pattern 29 is applied to the multiplexing circuit 30. Accordingly, when the first reset signal 24 is generated, the fixed value "1" output by the memory 11 will not be applied to the multiplexing circuit 30. The state where the fixed value "1" is not applied to the multiplexing circuit 30 continues until a time when a signal first applied to the memory 11 is read after the memory 11 is reset by the application of the second reset signal 26, or until an address at which the signal is read.

The timing generation circuit 21 outputs a second timing signal 33. The multiplexing circuit 30 multiplexes a signal selected by the selection circuit 27 between the memory output signal 19 output from the memory 11 and the unfixed pattern signal 29 output from the random pattern generation circuit 28 with an overhead bit under the control of the second timing signal 33.

To the OR circuit 25, a power-on reset circuit 34 is connected. The power-on reset circuit 34 outputs a third reset signal 35 so as to operate to have the already described phase difference of the memory 11 at an appropriate value at the time of power application. The third reset signal 35 output at the time of power application resets the memory 11, the write address counter 13 and the read address counter 14 and is also applied to the reset signal detection switch control circuit 31 through the OR circuit 25. The reset signal detection switch control circuit 31 outputs the switching signal 32 based on the third reset signal 35 to make the selection circuit 27 to select the unfixed pattern signal 29 between the memory output signal 19 and the unfixed pattern signal 29.

A multiplexed signal 36 output by the multiplexing circuit 30 is converted into an optical signal by an E/O converter 37, subjected to an optical fiber 38 and transmitted to an O/E conversion unit 39 on the reception side. The O/E conversion unit 39 includes a light receiving element 41, an amplifier 42, a discriminator 43 and a clock detection circuit 44. Between the light receiving element 41 and the amplifier 42, a first capacitor 45 is provided. Between the discriminator 43 and the amplifier 42, a second capacitor 46 is provided. The amplifier 42 is connected to the discriminator 43 and the clock detection circuit 44 in parallel. The signal applied to the O/E conversion unit 39 is converted into an electric digital signal 47 as a small signal by the light receiving element 41, only an alternating current component of which signal is amplified by the first capacitor 45 and the amplifier 42, and the amplified alternating current component is applied to the discriminator 43 through the second capacitor 46 and the clock detection circuit 44.

The clock detection circuit 44 extracts a clock component from the digital signal to output a clock 48. The discriminator 43 supplied with the clock 48 discriminates whether the signal applied to the discriminator 43 through the amplifier 42 and the second capacitor 46 is higher or lower than a threshold value set in the discriminator 43 and based on the "high" or "low", outputs an output signal 49 which is "1" or "0".

The signal applied to the O/E conversion unit 39 is a signal selected by the selection circuit 27 and a fixed value output by the memory 11 at the reset state will not be selected by the selection circuit 27, and during that period, a random pattern is selected by the selection circuit 27 and a mark rate of the random pattern is ensured to be 0.5, so that the signal applied to the O/E conversion unit 39 has a value unfixed enough. The unfixed value signal in the memory output signal 19 is not made into a direct current component by the capacitors 46 and 47 etc., which prevents a discrimination error of the discriminator 43. The random pattern generation circuit replaced by a scrambling circuit and a descrambling circuit has its circuit scale smaller enough than those of the scrambling circuit and the descrambling circuit.

Figure 2:
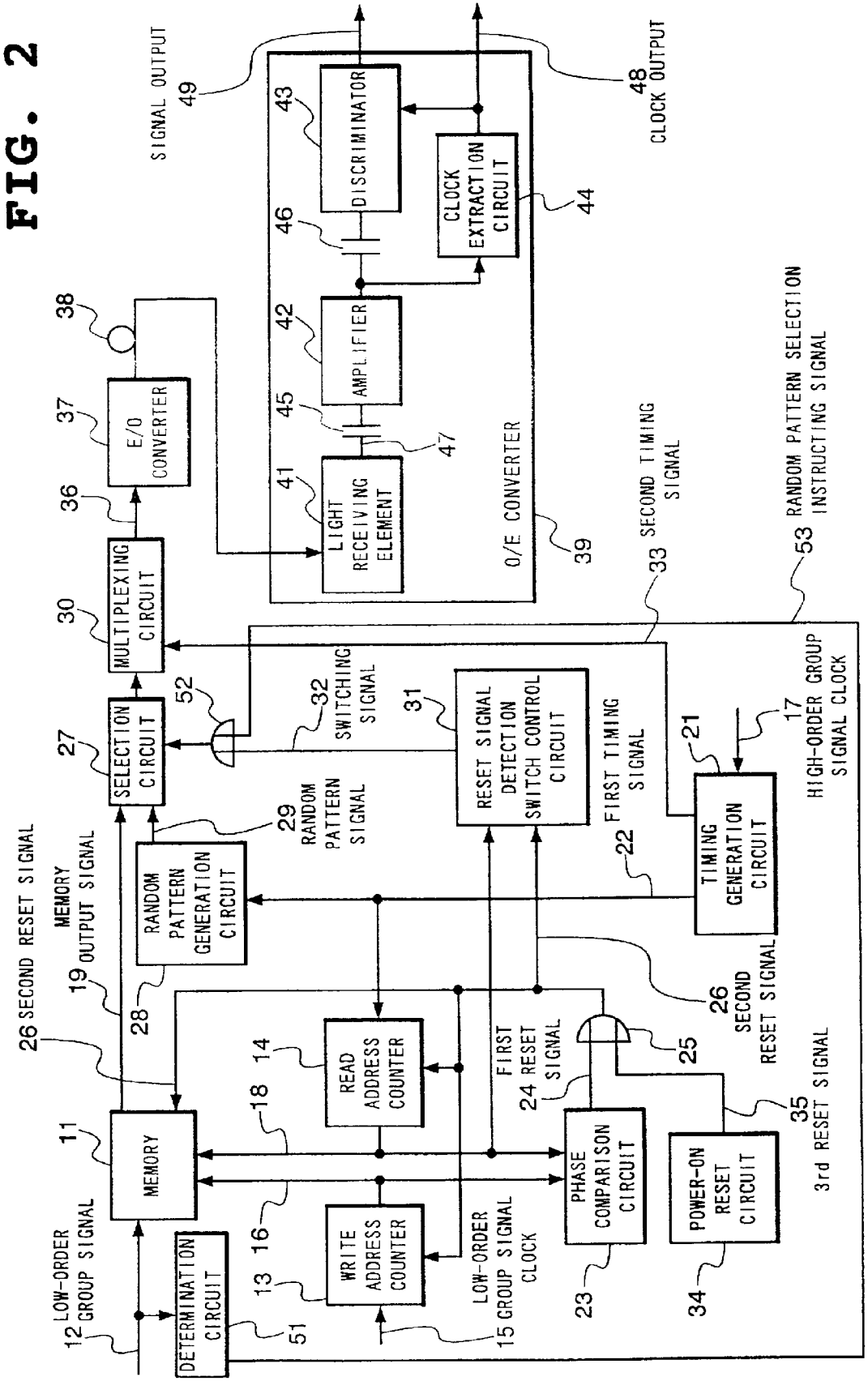
FIG. 2 is a circuit diagram showing a structure of a circuit for preventing transmission of a fixed pattern of an optical digital transmission equipment according to a second embodiment of the present invention.
Figure 3:
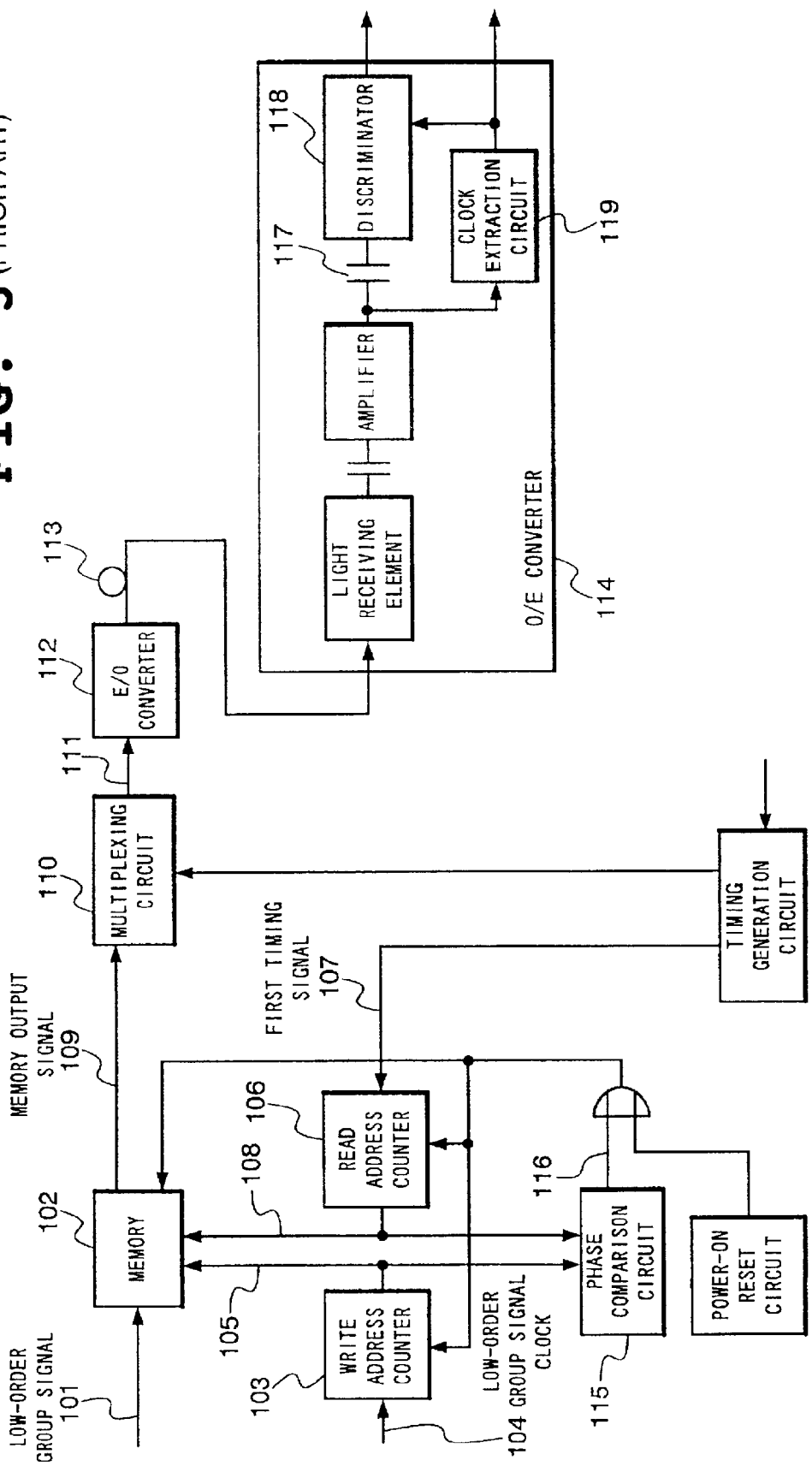
FIG. 3 is a circuit diagram showing one example of a conventional optical digital transmission equipment having a conventional phase comparator.

FIG. 2 shows another embodiment of the present invention. The present embodiment is realized by adding a determination circuit 51 and other OR circuit 52 to the whole circuit shown in FIG. 1. The other OR circuit 52 is provided between the selection circuit 27 and the reset signal detection switch control circuit 31. The already described switching signal 32 is applied to the other OR circuit 52. Between the other OR circuit 52 and the input side of the memory 11, the determination circuit 51 is provided. The determination circuit 51 outputs a random pattern selection instructing signal (switching signal) 53 when a signal written into the memory 11 has a fixed pattern limited to "1" or "0" during a set time. The selection circuit 27 supplied with the random pattern selection instructing signal 53 selects the unfixed pattern signal 29 between the memory output signal 19 and the unfixed pattern signal 29.

Thus, in a case where the already described memory phase difference in the memory 11 has a normal value, when the low-order group signal 12 has a fixed value, the multiplexed signal 36 has an unfixed value which will not be applied to the O/E conversion unit 39.

According to the present invention, no fixed signal is applied to a circuit having a capacitor, so that no direct current component is generated.

The circuit for preventing transmission of a fixed pattern of an optical digital transmission equipment according to the present invention prevents output of a fixed value of the optical digital transmission equipment and its prevention means is simple.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A circuit for preventing transmission of a fixed pattern of an optical digital transmission equipment, comprising:
    a memory for temporarily accumulating a low-order group signal;
    a multiplexing circuit for multiplexing an output signal output by said memory with an overhead bit necessary for optical digital transmission;
    a pattern generation circuit for generating an unfixed pattern having no fixed value and outputting the pattern to said multiplexing circuit;
    a selection circuit coupled to said multiplexing circuit, said pattern generating circuit, and said memory, wherein in response to reception of said fixed pattern output by said memory said selection circuit selects said unfixed pattern generated by said pattern generating circuit;

a phase comparator coupled to said selection circuit, said phase comparator outputting a reset signal that resets said memory based on a phase difference between a phase of write to said memory and a phase of read from the memory, wherein in response to said phase comparator, said selection circuit selects said unfixed pattern based on said reset signal output by said phase comparator; and a reset signal detection circuit for outputting a switching signal based on a read address signal applied to said memory from when said memory is reset until when a signal first written into said memory is read from said memory, wherein said selection circuit selects said unfixed pattern based on said reset signal and said switching signal.

2. The circuit for preventing transmission of a fixed pattern of an optical digital transmission equipment according to claim 1, further comprising:

a determination circuit and an OR circuit, wherein said determination circuit is provided between said OR circuit and an input side of said memory, said determination circuit outputs a switch signal when a signal written into said memory has a fixed pattern for a set time, to said OR circuit, said switching signal and said switch signal are applied, and said selection circuit selects said unfixed pattern based on said switch signal in addition to said reset signal and said switching signal.

3. A circuit for preventing transmission of a fixed pattern of an optical digital transmission equipment, comprising:

a memory for temporarily storing data;

a multiplexing circuit for multiplexing a signal output by said memory with an overhead bit necessary for optical digital transmission;

a pattern generation circuit for generating an unfixed pattern having no fixed value and outputting the pattern to said multiplexing circuit;

an E/O conversion unit for converting a signal output by said multiplexing circuit into an optical signal;

an optical fiber for transmitting an optical signal output by said E/O conversion unit;

an O/E conversion unit for converting an optical signal output by said optical fiber into an electric signal, wherein while said memory outputs a fixed pattern, the unfixed pattern is applied to said multiplexing circuit;

a selection circuit coupled to said multiplexing circuit, said pattern generating circuit, and said memory;

a phase comparator for outputting a reset signal which resets said memory based on a phase difference between a phase of write to said memory and a phase of read from the memory, wherein said selection circuit selects said unfixed pattern based on said reset signal; and a reset signal detection circuit for outputting a switching signal based on a read address signal applied to said memory from when said memory is reset until when a signal first written into said memory is read from said memory, wherein said selection circuit selects said unfixed pattern based on said reset signal and said switching signal.

4. The circuit for preventing transmission of a fixed pattern of an optical digital transmission equipment according to claim 3, further comprising a determination circuit and an OR circuit, wherein said determination circuit is provided between said OR circuit and an input side of said memory, said determination circuit outputs a switch signal when a signal written into said memory has a fixed pattern for a set time, to said OR circuit, said switching signal and said switch signal are applied, and said selection circuit selects said unfixed pattern based on said switch signal in addition to said reset signal and said switching signal.

5. A circuit for preventing transmission of a fixed pattern of an optical digital transmission equipment comprising:

a memory for temporarily accumulating a low-order group signal;

a multiplexing circuit for multiplexing an output signal output by said memory with an overhead bit necessary for optical digital transmission;

a pattern generation circuit for generating an unfixed pattern having no fixed value and outputting the pattern to said multiplexing circuit;

a selection circuit coupled to said multiplexing circuit, said pattern generating circuit, and said memory, wherein in response to reception of said fixed pattern output by said memory said selection circuit selects said unfixed pattern generated by said pattern generating circuit;

a phase comparator coupled to said selection circuit, said phase comparator outputting a reset signal that resets said memory based on a phase difference between a phase of write to said memory and a phase of read from the memory, wherein in response to said phase comparator, said selection circuit selects said unfixed pattern based on said reset signal output by said phase comparator; and a reset signal detection circuit for detecting said reset signal, wherein a read address signal applied to said memory is also applied to said reset signal detection circuit, said reset signal detection circuit outputs a switching signal based on said read address signal from when said memory is reset until when a signal first written into said memory is read from said memory, and said selection circuit selects said unfixed pattern based on said reset signal and said switching signal.

6. A circuit for preventing transmission of a fixed pattern of an optical digital transmission equipment comprising:

a memory for temporarily storing data;

a multiplexing circuit for multiplexing a signal output by said memory with an overhead bit necessary for optical digital transmission;

a pattern generation circuit for generating an unfixed pattern having no fixed value and outputting the pattern to said multiplexing circuit;

an E/O conversion unit for converting a signal output by said multiplexing circuit into an optical signal;

an optical fiber for transmitting an optical signal output by said E/O conversion unit;

an O/E conversion unit for converting an optical signal output by said optical fiber into an electric signal;

a selection circuit coupled to said multiplexing circuit, said pattern generating circuit, and said memory, wherein in response to reception of said fixed pattern output by said memory, said selection circuit selects said unfixed pattern generated by said pattern generating circuit;

a phase comparator for outputting a reset signal which resets said memory based on a phase difference between a phase of write to said memory and a phase of read from the memory, wherein said selection circuit selects said unfixed pattern based on said reset signal; and a reset signal detection circuit for detecting said reset signal, wherein a read address signal applied to said memory is also applied to said reset signal detection circuit, said reset signal detection circuit outputs a switching signal based on said read address signal from when said memory is reset until when a signal first written into said memory is read from said memory, and said selection circuit selects said unfixed pattern based on said reset signal and said switching signal.

* * * * *